US011909157B2

(12) United States Patent
Eichorst et al.

(10) Patent No.: US 11,909,157 B2
(45) Date of Patent: Feb. 20, 2024

(54) ELECTRICAL CONNECTORS INCLUDING GLASS SEALS AND METHODS OF FABRICATION

(71) Applicant: Honeywell Federal Manufacturing & Technologies, LLC, Kansas City, MO (US)

(72) Inventors: Dennis J. Eichorst, Lenexa, KS (US); Tieshu Huang, Kansas City, MO (US); Kaley M. McLain, Kansas City, MO (US); Richard K. Brow, Rolla, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 274 days.

(21) Appl. No.: 17/544,558

(22) Filed: Dec. 7, 2021

(65) Prior Publication Data

US 2023/0178950 A1 Jun. 8, 2023

(51) Int. Cl.
*H01R 43/00* (2006.01)
*H01R 13/52* (2006.01)

(52) U.S. Cl.
CPC ......... *H01R 43/005* (2013.01); *H01R 13/521* (2013.01)

(58) Field of Classification Search
CPC ..... H01R 43/005; H01R 43/20; H01R 13/521
See application file for complete search history.

(56) References Cited

U.S. PATENT DOCUMENTS 3,465,284 A * 9/1969 McManus ............ H01R 13/521
439/935
6,037,539 A * 3/2000 Kilgo ...................... C03C 29/00
174/50.61

FOREIGN PATENT DOCUMENTS

CN 102614580 A * 8/2012 ........... A61N 1/3718
CN 102614589 A * 8/2012 ........... A61N 1/3754

* cited by examiner

*Primary Examiner* — Tho D Ta
(74) *Attorney, Agent, or Firm* — Hovey Williams LLP

(57) ABSTRACT

An electrical connector comprises an outer shell, at least one pin, and an insulating seal. The outer shell includes at least one side wall defining a cavity and having an inner surface. The outer shell is formed from electrically conductive material. The pin is positioned within the cavity and is also formed from electrically conductive material. The insulating seal is configured to provide electrical isolation of the pin and fills the cavity between the inner surface of the side wall and the pin. The insulating seal is formed from glass doped with a transition metal oxide.

20 Claims, 5 Drawing Sheets

ELECTRICAL CONNECTORS INCLUDING GLASS SEALS AND METHODS OF FABRICATION

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to electrical connectors that include glass seals and methods of their fabrication.

DESCRIPTION OF THE RELATED ART

Electrical connectors provide an electrical connection between two components to transfer electronic signals, electric power, and/or electric ground. Electrical connectors may also be utilized to form a hermetic or vacuum seal on one or more of the components. Components include electronic devices, pieces of equipment, electrical cables, and the like, wherein an electrical connector is installed on an electronic device or piece of equipment and an electrical cable is coupled to the electrical connector.

The electrical connector includes an outer shell, at least one pin, and an insulating seal. The outer shell couples to a wall or panel of the electronic device or piece of equipment and includes a cavity defined by at least one side wall. The pin is positioned within the cavity of the outer shell. The pin and the cavity are each formed from electrically conductive material. The insulating seal provides electrical isolation for the pin and includes a through hole for each pin. The insulating seal is most commonly formed from silica-based glass. The electrical connector is fabricated by positioning the pin in the through hole of the insulating seal and positioning the insulating seal within the cavity of the outer shell. The assembly of the outer shell, the insulating seal, and the pin is placed in a furnace, such as a batch furnace or a continuous belt furnace, for heating. The assembly is heated to a high temperature—typically at or above a melting temperature of the glass of the insulating seal. The molten glass may fill the cavity of the outer shell, with the glass occupying a larger volume than when the electrical connector components were assembled. When the heating is terminated, the components cool and the glass of the insulating seal solidifies. During this time, thermal and mechanical stresses can form which can lead to defects in the electrical connector, such as the insulating seal cracking, the insulating seal separating from the outer shell, the pin separating from the insulating seal, and so forth. The defects in the electrical connector lead to lower manufacturing yields.

In order to prevent these stresses and avoid the defects that they cause, designers are often limited to simple geometries for the outer shell and the pin. In addition, the fixturing required to hold these components in place while the glass of the insulating seal melts limits the electrical connectors to simple designs. These issues may restrict the development of electrical connectors for more complex applications.

Another problem is that the high temperatures required to melt the glass of the insulating seal may also melt the outer shell and the pin—which should remain solid during the fabrication process. As a result, the choice of materials that can be used for the outer shell and the pin may be limited. Alternatively, a glass with a lower melting temperature may be required which may compromise other glass seal properties such as environmental stability.

SUMMARY OF THE INVENTION

Embodiments of the current invention address one or more of the above-mentioned problems and provide electrical connectors that can be manufactured with higher yields and methods of their fabrication. The methods include heating the outer shell with a first thermal control source, such as a heating and cooling jacket, and heating the insulating seal with a second, independent thermal control source, such as a laser source, so that the outer shell can be heated to a lower temperature than the insulating seal to reduce the amount of stress that the heated outer shell places on the insulating seal. In addition, the insulating seal includes glass doped with a transition metal oxide, which changes a peak energy absorption wavelength of the insulating seal. The peak energy absorption wavelength closely matches a wavelength of a laser beam generated by the laser source. This change in the material property of the insulating seal provides more specific control of the temperature of the insulating seal, reduces stresses in the electrical connector components, and improves the efficiency of the process. These improvements to the electrical connector components and their fabrication process also lead to more complex designs of the electrical connector.

One embodiment of the electrical connector broadly comprises the outer shell, at least one pin, and the insulating seal. The outer shell includes at least one side wall defining a cavity and having an inner surface. The outer shell is formed from electrically conductive material. The pin is positioned within the cavity and is also formed from electrically conductive material. The insulating seal is configured to provide electrical isolation of the pin and fills the cavity between the inner surface of the side wall and the pin. The insulating seal is formed from glass doped with a transition metal oxide.

An embodiment of the method broadly comprises assembling an outer shell, an insulating seal, and at least one pin to form an electrical connector; heating the outer shell using a first thermal control source; heating the insulating seal using a second thermal control source; cooling the outer shell using the first thermal control source; and cooling the insulating seal using the second thermal control source.

Another embodiment of the method broadly comprises receiving an outer shell including at least one side wall defining a cavity, an insulating seal including at least one through hole, and at least one pin; positioning the insulating seal within the cavity of the outer shell; positioning the at least one pin within the at least one through hole of the insulating seal; positioning the outer shell in an inner chamber of a heating and cooling jacket; heating the outer shell using the heating and cooling jacket; heating the insulating seal using a laser source to scan a laser beam across an upper surface of the insulating seal; cooling the outer shell using the heating and cooling jacket; and cooling the insulating seal using the laser source.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1A:
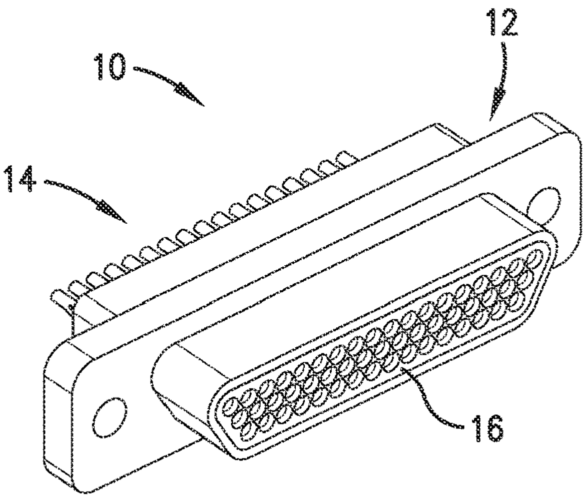
FIG. 1A is a front perspective view of an electrical connector, constructed in accordance with at least a first embodiment of the current invention, the electrical connector including an outer shell, an insulating seal, and a plurality of pins.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1B:
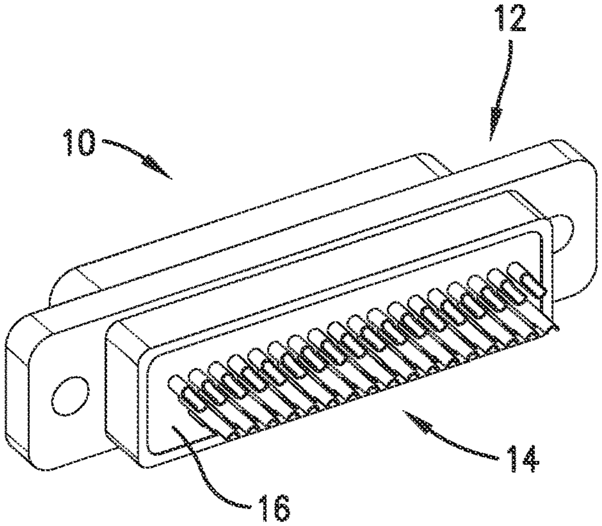
FIG. 1B is a rear perspective view of the electrical connector of FIG. 1A.
Figure 2A:
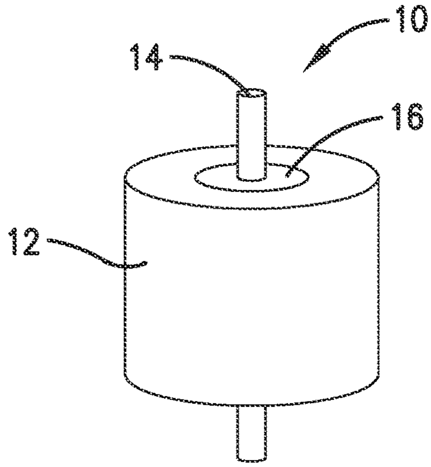
FIG. 2A is side perspective view of a second embodiment of the electrical connector including the outer shell, the insulating seal, and a single pin.
Figure 2B:
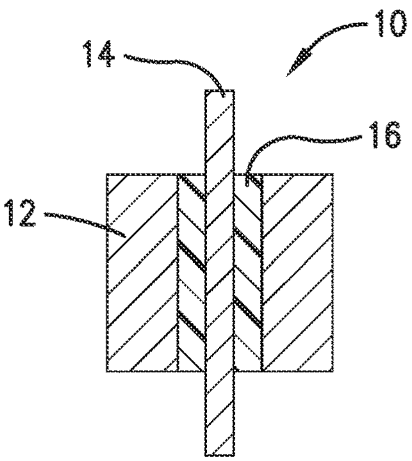
FIG. 2B is a side sectional view of the electrical connector cut along a vertical plane.

Referring to FIGS. 1A, 1B, 2A, and 2B, an electrical connector 10, constructed in accordance with various embodiments of the current invention, is shown. The electrical connector 10 broadly comprises an outer shell 12, at least one pin 14, and an insulating seal 16. The electrical connector 10 may be embodied by any one of a plurality of configurations or types of connector, such as a multipin connector as shown in FIGS. 1A and 1B or a single pin connector as shown in FIGS. 2A and 2B. Thus, the electrical connector 10 may connect to one or more single wires, one or more ribbon cables, printed circuit boards, flexible circuitry, and the like. In addition, the electrical connector 10 may be utilized in feed through, vacuum seal, or hermetic seal environments.

The outer shell 12 includes one or more side walls connected to one another to form an open-ended structure defining a cavity. In at least one embodiment, the outer shell 12 includes a single circumferential side wall with a hollow cylindrical shape. In other embodiments, the outer shell 12 may include four side walls connected to one another to form a square, rectangle, isosceles trapezoid, or similar shape. In some embodiments, the outer shell 12 may include four side walls that have a first shape at a first end and a second shape at a second end, such as an isosceles trapezoid shape at the first end and a rectangular shape at the second end, as shown in FIGS. 1A and 1B. The outer shell 12 may further include features on its outer surface which facilitate coupling, attaching, or securing the electrical connector 10 to another object, such as a housing, a chassis, another connector, or the like. The features may include threading, flanges, tabs, alignment structures, and so forth. The outer shell 12 may be formed from metals, metal alloys, combinations thereof, or the like.

The pin 14 is positioned within the cavity of the outer shell 12 and generally provides an electrically conductive structure for an electronic signal, electrical power, or electrical ground. Thus, the pin 14 is formed from electrically conductive materials, such as metals and/or metal alloys. The pin 14 may vary in length, cross-sectional area, cross-sectional shape, and so forth. The ends of the pin 14 may be male or plug type or female or receptacle type. In some embodiments, both ends of the pin 14 may be the same type. In other embodiments, one end of the pin 14 may be of one type and the other end of the pin 14 may be of the other type. One or both of the ends of the pin 14 may be solderable to wire, cable, printed circuit board, flexible circuitry, and the like. At least a portion of the length of the pin 14 is surrounded by, and in direct contact with, the insulating seal 16.

The insulating seal 16 generally provides electrical isolation of the one or more pins 14. The insulating seal 16 also seals and fills the space of the cavity between the inner surface of the outer shell 12 and the pins 14. Thus, the insulating seal 16 may have a shape that varies according to the shape of the outer shell 12. For example, if the outer shell 12 has a generally rectangular shape, then the insulating seal 16 has a generally rectangular shape. The insulating seal 16 includes a through hole opening for each pin 14. In the single pin embodiment of the electrical connector 10, the opening in the insulating seal 16 is located in the center thereof and spaced away from the edge thereof by a minimum distance. In the multiple pin embodiment of the electrical connector 10, the openings in the insulating seal 16 are spaced apart from one another by a minimum distance and spaced away from the edge by a minimum distance.

The insulating seal 16 is formed from electrically insulating material such as silica-based glass, SiO2, which has been doped with one or more transition metal oxides or ions in order to change the thermal absorption properties. The glass may be doped using a process such as adding low levels of oxides, carbonates, salts containing the desired metal ion along with the glass ingredients, melting the mixture and then cooling in a manner to prevent crystallization. Other doping processes may include diffusion, ion implantation, or the like. The oxide may be formed from any of the transition metals such as titanium, iron, nickel, copper, silver, gold, and the like. An exemplary embodiment of the insulating seal 16 includes alkali barium glass (GL1860) that has been doped with iron oxide Fe2O3. The insulating seal 16 may also include glass that has been doped with a plurality of transition metals oxides. The insulating seal 16 may have a uniform concentration or distribution of the transition metal oxide throughout the glass or may have a varied concentration of the transition metal oxide in the glass. For example, the insulating seal 16 may have a greater concentration of the transition metal oxide at one axial end compared with the opposing axial end of the insulating seal 16. The difference in concentration of the transition metal oxide within the glass from one end of the insulating seal 16 to the opposing end may have a linear or a non-linear gradient.

The electrical connector 10 may be fabricated by heating the insulating seal 16 independently from the other components, as discussed in more detail below. One source of heating the insulating seal 16 may be a laser source 18. The specific transition metal oxide may be chosen according to a wavelength of a laser beam from the laser source 18 that is used to heat the insulating seal 16. That is, different transition metal oxides have a peak energy absorption at different wavelengths of laser radiation. For example, iron oxide Fe2O3 has a peak energy absorption at a wavelength of approximately 1070 nanometers (nm). Typically, a particular laser source 18 emits the laser beam having a specific wavelength which is not easily adjustable. Therefore, the specific transition metal oxide may be chosen so that its peak energy absorption wavelength closely matches the wavelength of the laser beam from the particular laser source 18 used to heat the insulating seal 16 during the electrical connector 10 fabrication process.

Alternatively, the particular laser source 18 may be chosen according to the transition metal oxide that is used to dope the glass of the insulating seal 16. That is, the laser source 18 may be chosen so that the wavelength of its laser beam closely matches the peak energy absorption wavelength of the transition metal oxide.

In other embodiments, the insulating seal 16 may include glass that has been doped alternatively or additionally with a salt or a chloride.

Figure 3:
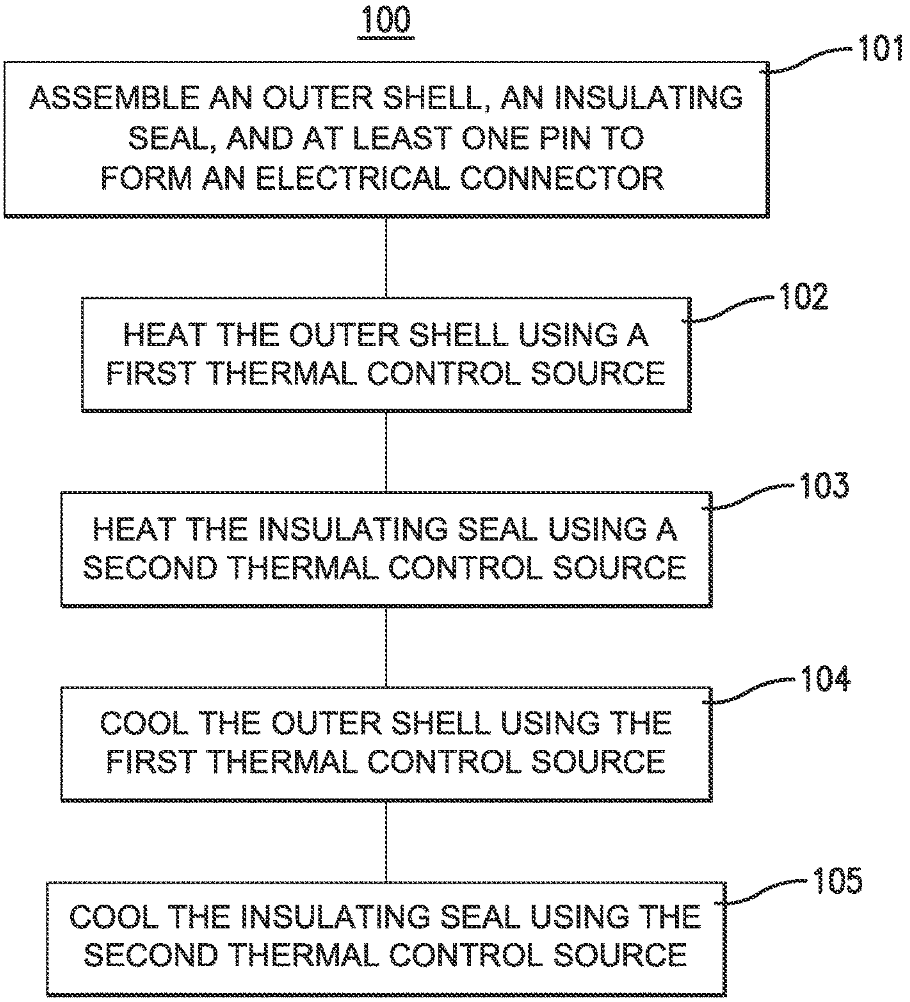
FIG. 3 depicts a listing of at least a portion of the steps of an exemplary method for fabricating an electrical connector with an insulating seal.

FIG. 3 depicts a listing of at least a portion of the steps of an exemplary method 100 for fabricating an electrical connector 10 with an insulating seal 16. The steps may be performed in the order shown in FIG. 3, or they may be performed in a different order. Furthermore, some steps may be performed concurrently as opposed to sequentially. In addition, some steps may be optional or may not be performed.

Referring to step 101, the components of an electrical connector 10, including an outer shell 12, at least one pin 14, and an insulating seal 16 are received. The outer shell 12, the pin 14, and the insulating seal 16 are each preformed. The outer shell 12 includes any features that are necessary to couple the electrical connector 10 to other objects. The pin 14 includes the end features, such as plug type or receptacle type, that are necessary or desired. The insulating seal 16 is formed so that it will occupy the space between the inner surfaces of the outer shell 12 and the one or more pins 14. Thus, the outer edges of the insulating seal 16 closely match the inner edges of the outer shell 12. In addition, the insulating seal 16 includes one opening (a through hole) for each pin 14.

The insulating seal 16 is also doped with a transition metal oxide. In a preliminary step, the insulating seal 16 is doped with a transition metal oxide that has a peak energy absorption wavelength which closely matches the wavelength of the laser beam from the particular laser source 18 used to heat the insulating seal 16 in a subsequent step.

Once received, the components are assembled as follows. The one or more pins 14 are each placed in an associated opening in the insulating seal 16. The insulating seal 16 and the one or more pins 14 are placed in the outer shell 12, with the outer surfaces of the insulating seal 16 in contact with the inner surfaces of the outer shell 12.

Referring to step 102, the outer shell 12 is heated using a first thermal control source. To control the temperature of the outer shell 12, a heating and cooling jacket 20 may be utilized. The heating and cooling jacket 20 includes an inner chamber defined by one or more side walls with at least one open end. The inner chamber may be generally shaped, or adapted, to match the external shape of the outer shell 12. For example, if the external shape of the outer shell 12 is generally cylindrical, then the shape of the inner chamber is generally cylindrical. In addition, the inner chamber may be generally sized, or adapted, to match the external size of the outer shell 12. That is, the side walls defining the inner chamber may contact the external surface of the outer shell 12 or be in very close proximity to the external surface of the outer shell 12.

The heating and cooling jacket 20 may include one or more thermal control elements and one or more types of thermal control elements. The thermal control elements may include electrically conductive coils that encircle the inner chamber, one or more fluid pathways, one or more gas pathways, and so forth. The heating and cooling jacket 20 is configured to increase the temperature to heat and decrease the temperature to cool the inner chamber walls, and thus the inner chamber, in a selective and controlled fashion.

Figure 4:
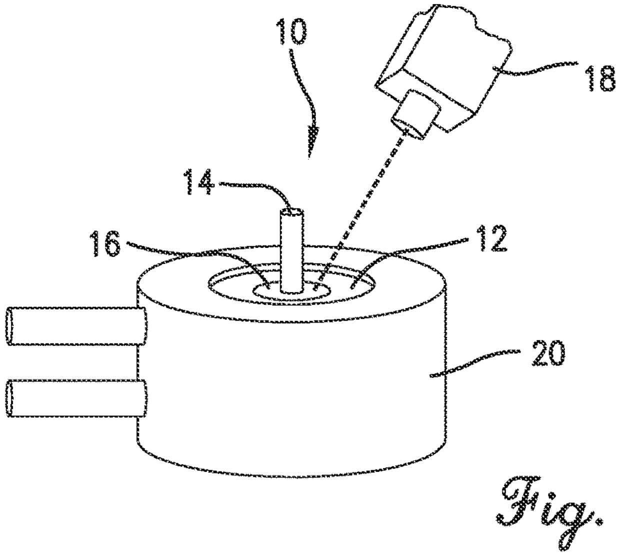
FIG. 4 is a perspective environmental view of implementation of the method utilizing a heating and cooling jacket and a laser source.

Referring to FIG. 4, the assembly of the outer shell 12, the insulating seal 16, and the pin 14 is placed in the inner chamber of the heating and cooling jacket 20 such that the external surfaces of the outer shell 12 contact, or are in close proximity to, the side walls of the inner chamber. The temperature of the inner chamber is increased to a first outer shell temperature at a first temperature increase rate and held at the first outer shell temperature for a first period of time.

In some embodiments, the heating and cooling jacket 20 (and the assembly of the outer shell 12, the insulating seal 16, and the pin 14) may receive an inert gas purge to control the ambient atmospheric environment of the heating and cooling jacket 20. In other embodiments, the heating and cooling jacket 20 (and the assembly of the outer shell 12, the insulating seal 16, and the pin 14) may be placed in a controlled atmosphere enclosure.

Referring to step 103 and FIG. 4, the insulating seal 16 is heated using a second thermal control source. To control the temperature of the outer shell 12, the laser source 18 may be utilized to perform a selective laser sintering process. In other embodiments, the second thermal control source may include an electron beam generator, wherein the electron beam is utilized in a manner very similar to the laser beam discussed below. If a controlled atmosphere enclosure is utilized in step 102, then the laser source 18 (or an electron beam source) may positioned within the enclosure or outside the enclosure with the ability to direct a laser beam into the enclosure.

Figure 5A:
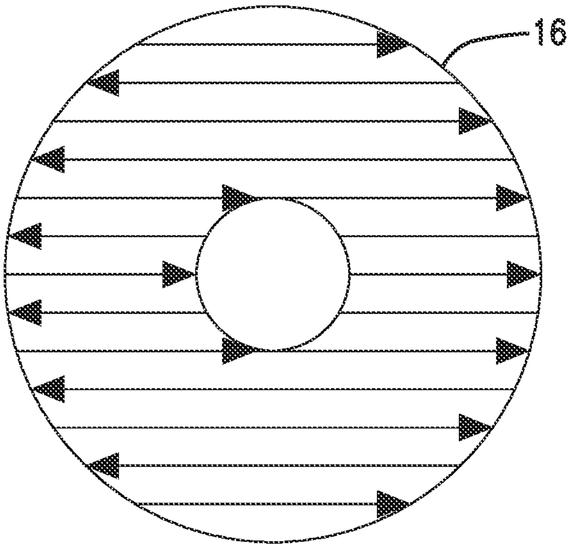
FIG. 5A is a top view of the insulating seal with a serpentine raster pattern that is followed by a laser beam from the laser source.

The laser source 18 may be embodied by any one of a plurality of types of laser source. The laser source 18 is configured to output a variable power laser beam. The laser source 18, the heating and cooling jacket 20, or both are configured to have controlled two-dimensional motion so that the laser beam can be directed to impinge the insulating seal 16, or an exposed upper surface thereof, in a specific pattern. Referring to FIG. 5A, an exemplary pattern includes a serpentine raster pattern as shown on the upper surface of the insulating seal 16 in isolation. The serpentine raster pattern includes a plurality of parallel directional traces or lines which may be successively numbered and wherein the odd-numbered traces are oriented in a first direction and the even-numbered traces are oriented in a second direction, opposite to the first direction. The serpentine raster pattern is overlaid on the upper surface of the insulating seal 16. When the laser beam is following the serpentine raster pattern, it may start at, or near, the edge at a first location of the circumference of the upper surface of the insulating seal 16. The laser beam follows the sequence of traces back and forth until the last trace is followed and the pattern ends at, or near, the edge at a second location of the circumference, generally opposite from the first location. The laser beam may be generated continuously or may be pulsed.

Figure 5B:
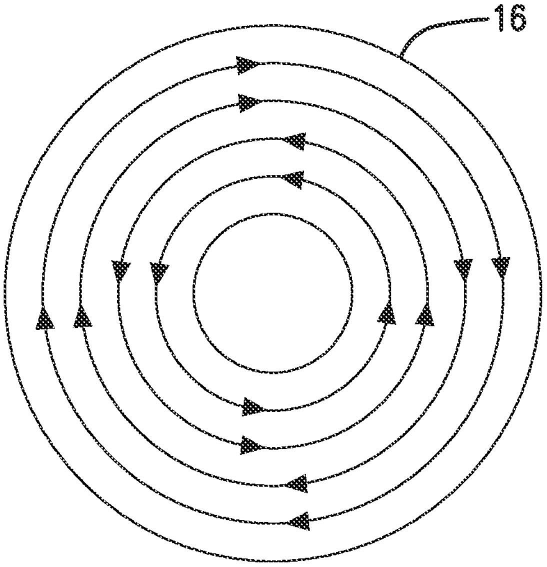
FIG. 5B is a top view of the insulating seal with a concentric circle raster pattern that is followed by the laser beam from the laser source.
Figure 5C:
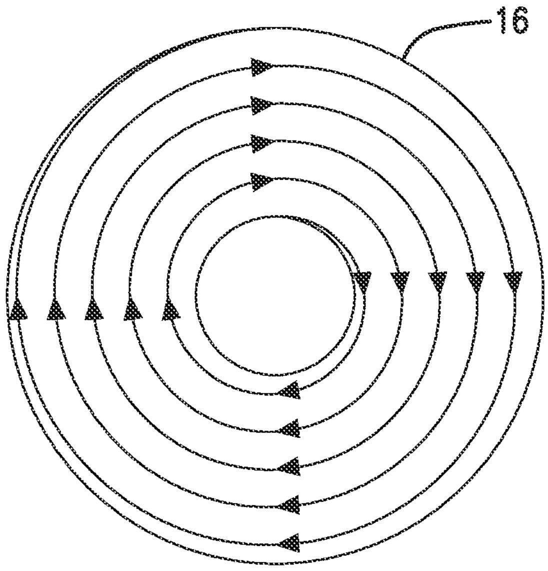
FIG. 5C is a top view of the insulating seal with a first helical or spiral raster pattern that is followed by the laser beam from the laser source.
Figure 5D:
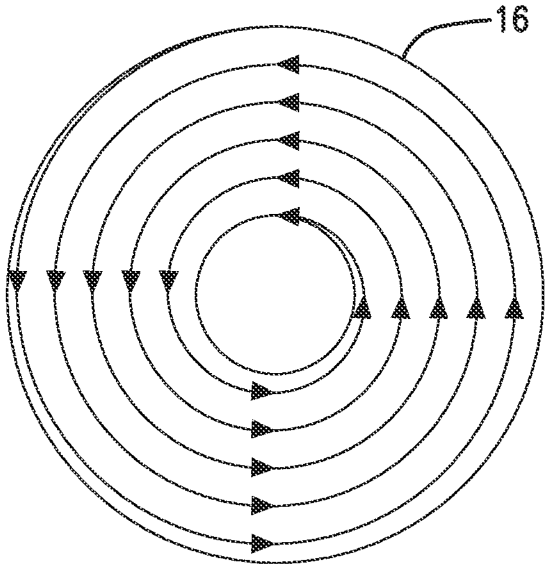
FIG. 5D is a top view of the insulating seal with a second helical or spiral raster pattern that is followed by the laser beam from the laser source.

Referring to FIGS. 5B, 5C, and 5D, other patterns for the laser beam to follow are shown. In FIG. 5B, a concentric circle pattern is shown. The laser source 18 may start the laser beam, follow a quarter circle pattern, and then stop repeatedly until the full circle is completed—each time starting the laser beam at the point where it had previously stopped. Or, the laser source 18 may complete a full circle pattern without stopping. The laser source 18 may emit the laser beam to follow some circle patterns in a clockwise fashion and follow other circle patterns in a counter clockwise fashion. The laser source 18 may complete the inner circle patterns followed by the outer circle patterns or vice versa. In FIG. 5C, a helical or spiral pattern that starts at the inner radius and ends at the outer radius is shown. In FIG. 5D, a helical or spiral pattern that starts at the outer radius and ends at the inner radius is shown. The laser beam may be generated continuously or may be pulsed.

At generally the same time as step 102 is being performed and the outer shell 12 is being heated, the laser beam is directed onto the upper surface of the insulating seal 16 and follows the serpentine raster pattern. The spacing between the traces of the serpentine raster pattern, the speed of the laser beam, and the power of the laser beam may each be selectively controlled to raise the temperature of the insulating seal 16 to a desired value. Assuming the spacing between the traces of the serpentine raster pattern and the speed of the laser beam are held relatively constant, then the power of the laser beam may be varied from scan to scan accordingly to provide a desired thermal profile for the insulating seal 16. An exemplary laser beam power schedule is shown in the laser power vs. scan number plot of FIG. 6. Each scan indicated by the scan number includes the laser beam following the serpentine raster pattern across the entire upper surface of the insulating seal 16. The temperature of the insulating seal 16 is proportional to, positively correlated with, or varies according to, the power of the laser beam. As shown in the plot, the power of the laser beam, and thus the temperature of the insulating seal 16, is raised at a rate corresponding to a second temperature increase rate on successive scans and then held at a certain value, corresponding to a first insulating seal temperature of the insulating seal 16, for repeated scans. The first outer shell temperature has a value that is less than a value of the first insulating seal temperature.

Referring to step 104, the outer shell 12 is cooled by the heating and cooling jacket 20. The temperature of the outer shell 12 is lowered at a first temperature decrease rate to a second outer shell temperature.

Figure 6:
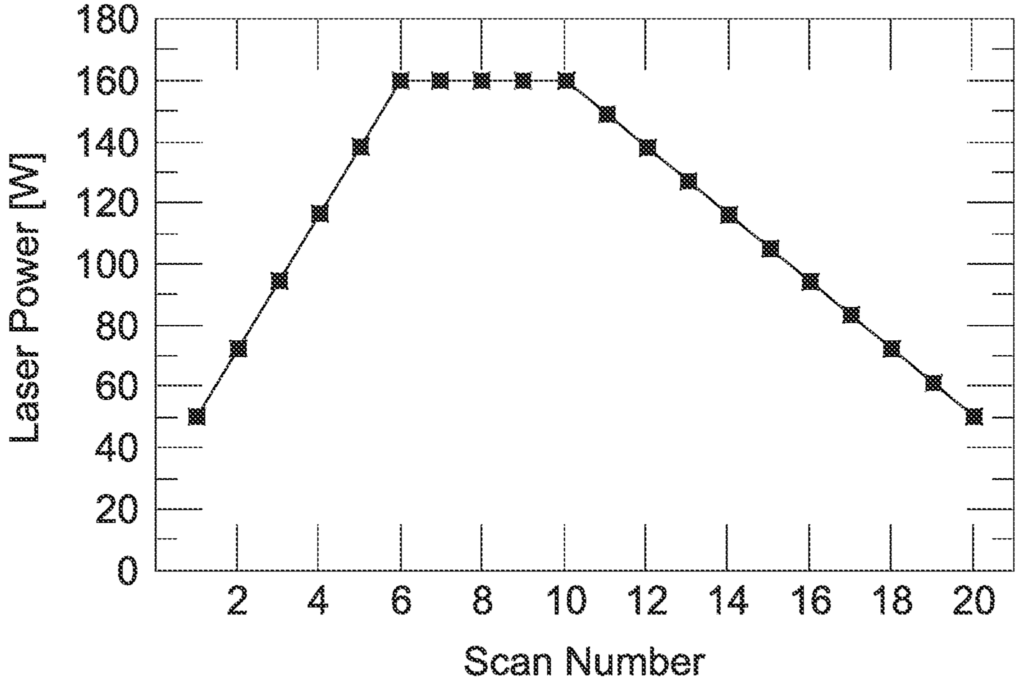
FIG. 6 is a plot of a laser power vs. a scan number for scanning the insulating seal with the laser source.

Referring to step 105, the insulating seal 16 is cooled by the laser source 18. As shown in FIG. 6, the power of the laser beam, and thus the temperature of the insulating seal 16, is lowered at a rate corresponding to a second temperature decrease rate on successive scans. The first temperature decrease rate is less than the second temperature increase rate so that the insulating seal 16 is cooled more slowly than it is heated. The temperature of the insulating seal 16 is lowered to a second insulating seal temperature. After the temperature of the insulating seal 16 is lowered to the second insulating seal temperature and the temperature of the outer shell 12 is lowered to the second outer shell temperature, the assembly of the outer shell 12, the insulating seal 16, and the pin 14 (i.e., the electrical connector 10) is removed from the heating and cooling jacket 20 and the active area of the laser source 18. The electrical connector 10 may cool further to room temperature.

The method 100 allows for the outer shell 12 and the insulating seal 16 to heated and cooled separately. Thus, not only can the outer shell 12 and the insulating seal 16 be heated to different temperatures (with the outer shell 12 being heated to a lower temperature than the insulating seal 16), but the two components can also be heated at different rates, if desired. In addition, the doping of the insulating seal 16 with a transition metal oxide that is sensitive to the wavelength of the laser beam allows for more precise control of the temperature of the insulating seal 16. All of these features lead to lower thermal stress on the insulating seal 16, which in turn leads to greater yield of the electrical connector 10. In addition, these features allow for the selection of a wider range of materials, such as glasses and metals, for the components of the electrical connector 10.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An electrical connector comprising:

an outer shell including at least one side wall defining a cavity and having an inner surface, the outer shell formed from electrically conductive material;

at least one pin positioned within the cavity and formed from electrically conductive material;

an insulating seal configured to provide electrical isolation of the at least one pin, the insulating seal filling the cavity between the inner surface of the at least one side wall and the at least one pin, the insulating seal formed from glass doped with a transition metal oxide.

2. The electrical connector of claim 1, wherein the electrically insulating material includes alkali barium glass.

3. The electrical connector of claim 1, wherein the transition metal oxide includes iron oxide.

4. A method for fabricating an electrical connector, the method comprising:

assembling an outer shell, an insulating seal, and at least one pin to form an electrical connector;

heating the outer shell using a first thermal control source;

heating the insulating seal using a second thermal control source;

cooling the outer shell using the first thermal control source; and cooling the insulating seal using the second thermal control source.

5. The method of claim 4, wherein the insulating seal is formed from electrically insulating material doped with a transition metal oxide.

6. The method of claim 4, wherein heating the outer shell includes increasing a temperature of the outer shell to a first temperature value, and heating the insulating seal includes increasing a temperature of the insulating seal to a second temperature value that is greater than the first temperature value.

7. The method of claim 4, wherein the outer shell includes at least one side wall defining a cavity, the insulating seal includes at least one through hole, and assembling the outer shell, the insulating seal, and the at least one pin includes positioning the insulating seal within the cavity of the outer shell and positioning the at least one pin in the at least one through hole of the insulating seal.

8. The method of claim 4, wherein the first thermal control source is a heating and cooling jacket including an inner chamber in which the assembly of the outer shell, the insulating seal, and the at least one pin is positioned.

9. The method of claim 8, wherein the inner chamber of the heating and cooling jacket is defined by one or more side walls and an outer surface of the outer shell is in contact with an inner surface of the one or more side walls.

10. The method of claim 4, wherein the second thermal control source is a laser source utilized to scan a laser beam across an upper surface of the insulating seal.

11. The method of claim 10, wherein heating the insulating seal includes repeatedly scanning the upper surface of the insulating seal with the laser beam and increasing a power of the laser beam at a first rate on successive scans.

12. The method of claim 11, wherein cooling the insulating seal includes repeatedly scanning the upper surface of the insulating seal with the laser beam and decreasing the power of the laser beam at a second rate on successive scans, such that the second rate is less than the first rate.

13. The method of claim 10, wherein the laser source is utilized to scan the laser beam across the upper surface of the insulating seal in a serpentine raster pattern.

14. A method for fabricating an electrical connector, the method comprising:

receiving an outer shell including at least one side wall defining a cavity, an insulating seal including at least one through hole, and at least one pin;

positioning the insulating seal within the cavity of the outer shell;

positioning the at least one pin within the at least one through hole of the insulating seal;

positioning the outer shell in an inner chamber of a heating and cooling jacket;

heating the outer shell using the heating and cooling jacket;

heating the insulating seal using a laser source to scan a laser beam across an upper surface of the insulating seal;

cooling the outer shell using the heating and cooling jacket; and cooling the insulating seal using the laser source.

15. The method of claim 14, wherein the insulating seal is formed from electrically insulating material doped with iron oxide and the laser beam has a wavelength of approximately 1070 nanometers.

16. The method of claim 14, wherein heating the outer shell includes increasing a temperature of the outer shell to a first temperature value, and heating the insulating seal includes increasing a temperature of the insulating seal to a second temperature value that is greater than the first temperature value.

17. The method of claim 14, wherein the inner chamber of the heating and cooling jacket is defined by one or more side walls and an outer surface of the outer shell is in contact with an inner surface of the one or more side walls.

18. The method of claim 14, wherein heating the insulating seal includes repeatedly scanning the upper surface of the insulating seal with the laser beam and increasing a power of the laser beam at a first rate on successive scans.

19. The method of claim 18, wherein cooling the insulating seal includes repeatedly scanning the upper surface of the insulating seal with the laser beam and decreasing the power of the laser beam at a second rate on successive scans, such that the second rate is less than the first rate.

20. The method of claim 14, wherein the laser source is utilized to scan the laser beam across the upper surface of the insulating seal in a serpentine raster pattern.

* * * * *